United States Patent [19]

Wakabayashi et al.

[11] Patent Number: 5,508,768

[45] Date of Patent: Apr. 16, 1996

[54] CAMERA HAVING A MAGNETIC HEAD

[75] Inventors: Hiroshi Wakabayashi, Yokohama; Koichi Daitoku, Sagamihara; Tsutomu Wakabayashi, Yokohama; Akira Ezawa, Kawasaki, all of Japan

[73] Assignee: Nikon Corporation, Tokyo, Japan

[21] Appl. No.: 484,884

[22] Filed: Jun. 7, 1995

Related U.S. Application Data

[63] Continuation of Ser. No. 337,515, Nov. 8, 1994, abandoned, which is a continuation of Ser. No. 209,230, Mar. 14, 1994, abandoned, which is a continuation of Ser. No. 892,336, Jun. 2, 1992, abandoned.

[30] Foreign Application Priority Data

Jun. 5, 1991 [JP] Japan ..................... 3-160927

[51] Int. Cl.$^6$ ................... G03B 17/24
[52] U.S. Cl. ................... 354/106
[58] Field of Search ............. 354/21, 75, 76, 354/105, 106; 360/105, 109

[56] References Cited

U.S. PATENT DOCUMENTS

| | | | |
|---|---|---|---|
| 4,375,071 | 2/1983 | Crowley et al. | 360/109 X |
| 4,843,414 | 6/1989 | Yoshino | 354/21 |
| 4,947,196 | 8/1990 | Wash et al. | 354/76 |
| 5,005,031 | 4/1991 | Kelbe | 354/106 |
| 5,016,030 | 5/1991 | Dwyer et al. | 354/106 X |

FOREIGN PATENT DOCUMENTS 3-168624  7/1991  Japan .

*Primary Examiner*—Howard B. Blankenship
*Attorney, Agent, or Firm*—Shapiro and Shapiro

[57] ABSTRACT

A camera has a magnetic head for data recording and reproduction disposed in opposed relationship with a data recording portion provided on film loaded into the camera and adapted to be biased against the film, a pad for pushing the film into contact with the fore end surface of the magnetic head, and a positioning portion formed on the magnetic head. Further, a reference surface is formed in opposed relationship with the positioning portion and bears against the positioning portion to thereby position that surface of the magentic head which contacts with the film at a position in which no deformation is caused in the film. As the reference surface, use may be made of an outer film guild rail which is originally provided in the camera.

38 Claims, 2 Drawing Sheets

CAMERA HAVING A MAGNETIC HEAD

This is a continuation of application Ser. No. 08/337,515 filed Nov. 8, 1994, which is a continuation of application Ser. No. 08/209,230 filed Mar. 14, 1994, which is a continuation of application Ser. No. 07/892,336 filed Jun. 2, 1992, all of which are now abandoned.

BACKGROUND OF THE INVENTION

1. Field of the Invention

This invention relates to a camera having a magnetic head for recording photographing data or the like on a recording portion formed in film and reading recorded data, and particularly to a positioning structure for positioning the magnetic head relative to the recording portion of the film.

2. Related Background Art

In recent years, in still cameras or the like, a magnetic head for recording and reproduction is contained in the camera body and design is made such that this magnetic head can be utilized to record photographing data such as the exposure conditions during photographing, the presence of exposure, etc. on a recording area differing from the exposed area of each photographing frame on film, or read recorded data. Also, as a recording region for such photographing data, use is made of that edge portion of the film which is opposed to an inner rail formed along the upper and lower end edges of the aperture of the camera body, and it is preferable that the magnetic head and a pressure contact pad be disposed in such a manner that this edge portion of the film can be sandwiched between two surfaces.

In a still camera, the planarity of film is maintained by an outer rail and a pressure plate, but it is necessary to prevent the film from being flexed by the contact force between the magnetic head and the pressure contact pad, thereby spoiling the planarity of the film. Therefore, it is necessary that the fore end surface of the magnetic head which contacts with the film be positioned highly accurately.

However, in the recent cameras which have been made compact and light in weight as well as automated, there is no spatial surplus and therefore, it is desired that the positioning of the magnetic head can be simply accomplished by a small number of parts and at a low cost.

SUMMARY OF THE INVENTION

It is the object of the present invention to provide a camera having a magnetic head in which the positioning of the magnetic head for recording and reproduction can be accomplished simply and at a low cost and a reduction in the number of parts is made possible.

The camera of the present invention includes a magnetic head for recording and reproduction disposed in opposed relationship with a data recording portion provided on film loaded into the camera and adapted to be biased against the film, a pad for pushing the film into contact with the fore end surface of the magnetic head, a positioning portion formed on the magnetic head, and a reference surface formed on the body of the camera in opposed relationship with the positioning portion and bearing against the positioning portion to thereby position that surface of the magnetic head which contacts with the film at a position in which no deformation is caused in the film.

As the reference surface, use may be made of an outer rail for guiding the film and originally provided in the camera.

According to the present invention, simply by the positioning portion and the reference surface or the outer rail being brought into contact with each other, the fore end surface of the magnetic head which contacts with the film is positioned at a position in which the film is not deformed, whereby the positioning of the magnetic head becomes simple and the recording of data on the recording portion of the film by the magnetic head and the reading of data from the recording portion by the magnetic head are made possible.

DESCRIPTION OF THE PREFERRED EMBODIMENTS

FIRST EMBODIMENT

Figure 1:
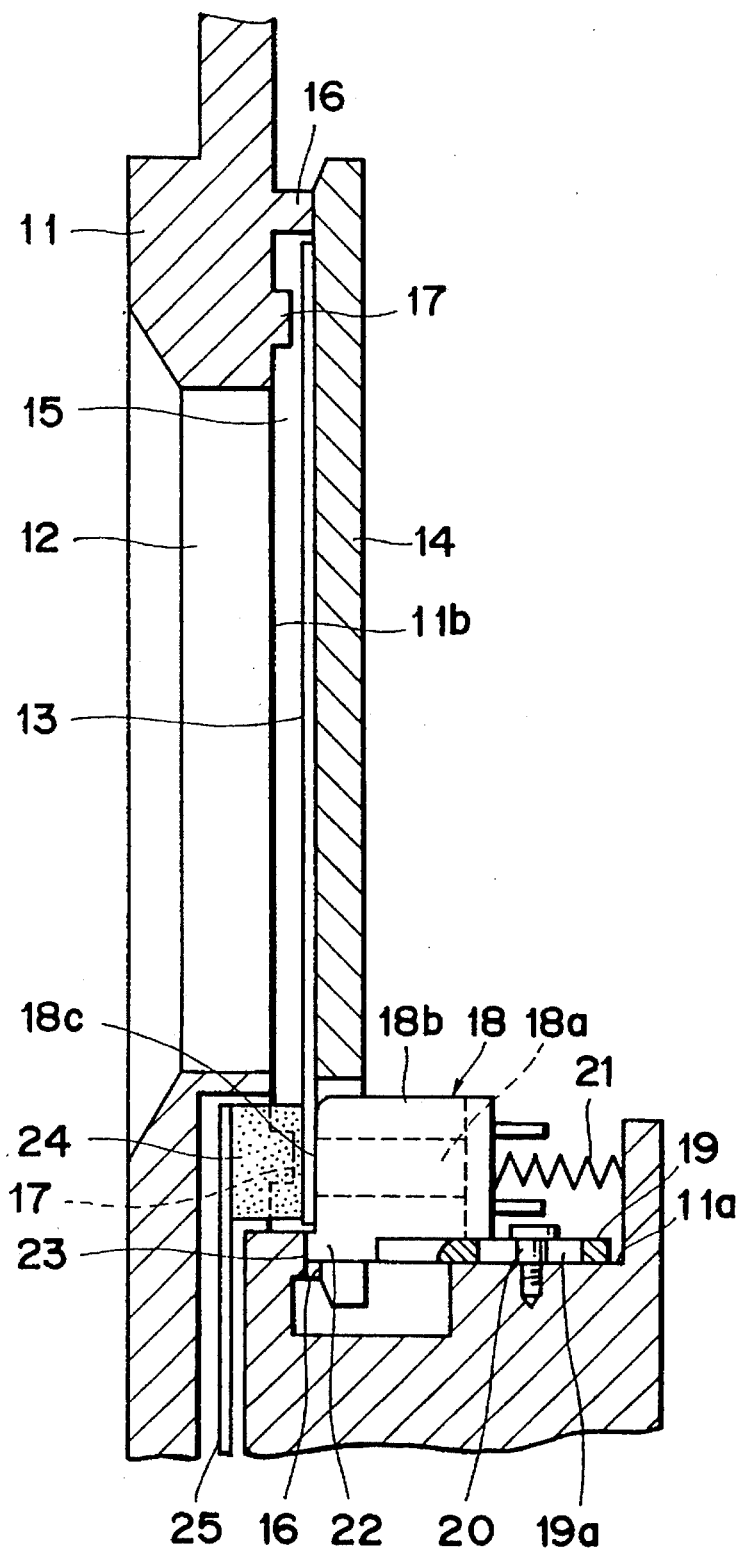
FIG. 1 is a cross-sectional view of the principal portions of a first embodiment of the present invention.

Referring to FIG. 1, the reference numeral 11 designates a camera body, and the reference numeral 12 denotes an aperture formed in the camera body 11. This aperture 12 regulates light incident from a photo-taking lens system, not shown, and determines a photographing image field on film 13. On the back of the aperture 12, there is disposed a pressure plate 14 for pressing the film 13 from the back thereof to make the film 13 face the aperture 12, and this pressure plate 14 is biased toward the film 13 (leftwardly as viewed in FIG. 1) by a spring member, not shown.

The reference numeral 15 designates a film passageway formed between the back 11b of the camera body in which the aperture 12 opens and the pressure plate 14 with an interval greater than the thickness of the film 13. This film passageway 15 is formed in the gap portion between outer film guide rails 16 extending laterally (in the direction into and out of the plane of FIG. 1) on the upper and lower edges of the aperture 12 and inner rails 17 provided inside and in parallelism to the outer rails 16.

The reference numeral 18 denotes a magnetic head for recording and reproduction disposed in a portion opposed to the lower inner rail 17 from the back side of the film 13. The magnetic head 18 is provided with a core portion 18a having a coil wound thereon, and a housing 18b for containing the core portion therein. Also, the magnetic head 18 is supported in the camera body 11 for movement toward and away from the film 13.

A mechanism for movably supporting the magnetic head 18 is constructed by a support portion 19 which is provided on the housing 18b being placed on an installation surface 11a provided in the camera body 11, and a stepped screw 20 being inserted into a slot 19a formed in the support portion 19 to thereby threadably attach the support portion 19 to the installation surface 11a. A spring member 21 is provided for biasing the entire magnetic head 18 toward the film 13.

The magnetic head 18 has a positioning portion 22 provided integrally with the front surface side of the housing 18b thereof, and a reference surface 23 against which the positioning portion 22 bears is formed on the camera body 11. Accordingly, by the positioning portion 22 being caused to bear against the reference surface 23 by the spring force of the spring member 21, the fore end surface 18c of the magnetic head 22, and more particularly the fore end surface of the core portion 18a, is positioned coplanarly with that surface of the pressure plate 14 which contacts with the film. The fore end surface of the core portion 18a may be positioned in a state in which it is protruded somewhat more toward the front side of the camera (leftwardly as viewed in FIG. 1) than that surface of the pressure plate 14 which contacts with the film.

The reference numeral 24 designates a pressure contact pad disposed on the exposed surface side of the film 13 in opposed relationship with the magnetic head 18. This pressure contact pad 24 is supported by a leaf spring 25 mounted on the camera body 11, whereby the lower edge portion of the film 13 is pressed against the fore end surface of the magnetic head 18 in a state in which the film 13 is not-deformed.

The spring pressure of the spring member 21 which biases the magnetic head 18 toward the film is sufficiently greater than the spring pressure of the leaf spring 25 for biasing the pressure contact pad 24.

In the first embodiment thus constructed, if the positioning portion 22 and the reference surface 23 are pre-worked highly accurately, the magnetic head 18 biased toward the film 13 by the spring member 21 can be positioned simply and highly accurately relative to the recording portion of the film 13 by the positioning portion 22 of the magnetic head being merely caused to bear against the reference surface 23 of the camera body 11, and any regulation becomes unnecessary. In addition, a reduction in the number of parts and a reduction in cost become possible. Further, there is no possibility of the film 13 being deformed to cause partial fuzziness on the exposed surface of the film.

SECOND EMBODIMENT

Figure 2:
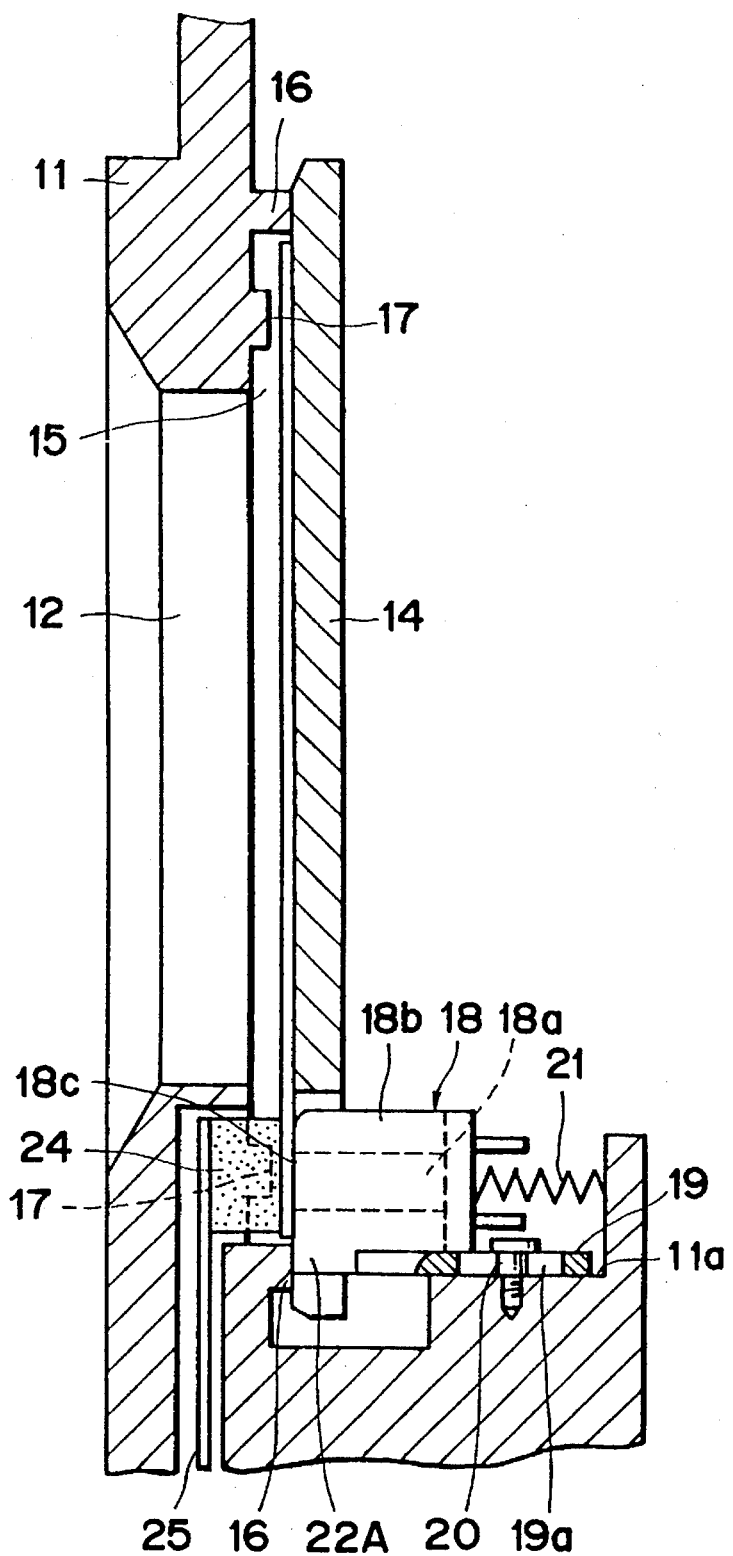
FIG. 2 is a cross-sectional view of the principal portions of a second embodiment of the present invention.

In FIG. 2, portions identical to those in FIG. 1 are given identical reference characters and the constructions thereof need not be described, but chiefly portions differing from those in FIG. 1 will hereinafter be described.

The difference of this second embodiment from the first embodiment is that the lower outer rail 16 already formed highly accurately is utilized as the reference surface for positioning the magnetic head 18 and the protrusion height of a positioning portion 22A formed on the housing 18b of the magnetic head is determined in accordance with the height dimension this outer rail 16 to thereby make positioning possible.

In such second embodiment, not only an effect similar to that of the first embodiment is obtained, but also the already provided outer rail 16 is utilized as the reference surface, whereby the working of the reference surface as shown in the first embodiment becomes unnecessary and a further reduction in cost becomes possible.

In the foregoing embodiments, description has been made of the case where the positioning portion formed on the housing of the magnetic head is caused to bear against the reference surface of the camera body to thereby accomplish the positioning of the magnetic head, whereas this is not restrictive, but the core portion may be caused to bear against the reference surface to thereby accomplish the positioning of the magnetic head.

Further, in the first embodiment, the positioning portion of the magnetic head is made into a convex shape, but alternatively, the positioning portion may be made into a concave shape and may be recessed from the core portion toward the back Of the camera and in addition, the magnetic head may be supported by the back lid of the camera.

As described above, according to the present invention, a positioning portion is provided on the magnetic head, and the magnetic head is caused to directly bear against the reference surface provided on the camera body side in opposed relationship with the positioning portion or against the outer rail originally provided in the camera with it as the reference surface and therefore, a reduction in the number of parts can be achieved and the magnetic had can be highly accurately positioned simply and at a low cost without deforming or otherwise adversely effecting the film.

We claim:

1. A camera comprising:
   a magnetic head for data recording and reproduction disposed so as to be in opposed relationship with a data recording portion provided on film loaded into the camera and having a front side with a film contacting surface adapted to be biased against said film;
   a pad for pushing said film into contact with said film contacting surface of said magnetic head;
   a positioning portion formed integrally with a housing of said magnetic head and having a front surface for positioning said magnetic head; and
   a reference surface formed on the body of the camera in opposed relationship with said positioning portion and with respect to which said magnetic head is movable along a front-to-back direction of said magnetic head, said reference surface being adapted to bear against said front surface of said positioning portion to thereby position said magnetic head such that said film contacting surface of said magnetic head contacts the film but causes substantially no deformation of the film.

2. A camera according to claim 1, wherein said front surface of said positioning portion is offset from said film contacting surface of said magnetic head along a front-to-back direction of said magnetic head.

3. A camera according to claim 1, wherein said magnetic head is biased toward said film by a spring.

4. A camera according to claim 3, wherein said magnetic head is mounted to the camera body by a plate movably attached to the camera body.

5. A camera according to claim 4, wherein said spring is located between a back side of said magnetic head and a portion of the camera body disposed rearwardly of said magnetic head.

6. A camera according to claim 3, wherein said pad is supported by spring means providing a spring force opposing that of said magnetic head biasing spring, the force of said magnetic head biasing spring being greater than that of said spring means.

7. A camera comprising:
   a magnetic head for data recording and reproduction disposed so as to be in opposed relationship with a data recording portion provided on film loaded into the camera and having a front side with a film contacting surface adapted to be biased against said film;
   a pad for pushing said film into contact with said film contacting surface of said magnetic head;
   a film guide rail attached to a body of the camera for guiding said film; and
   a positioning portion disposed on said magnetic head and having a front surface disposed in opposition to a surface of said film guide rail;
   said surface of said film guide rail being adapted to bear against said front surface of said positioning portion to thereby position said magnetic head such that said film contacting surface of said magnetic head contacts the film but causes substantially no deformation of the film.

8. A camera according to claim 7, wherein said film guide rail is one of a pair of outer rails originally provided in the camera.

9. A camera according to claim 7, wherein said magnetic head is biased toward the film by a spring.

10. A camera according to claim 9, wherein said magnetic head is mounted to the camera body by a plate movably attached to the camera body.

11. A camera according to claim 10, wherein said spring is located between a back side of said magnetic head and a portion of the camera body disposed rearwardly of said magnetic head.

12. A camera according to claim 9, wherein said pad is supported by spring means providing a spring force opposing that of said magnetic head biasing spring, the force of said magnetic head biasing spring being greater than that of said spring means.

13. A camera comprising:
   a magnetic data recording and reproduction head for disposition in opposed relationship with a data recording portion provided on film loaded into the camera and having a front side with a film contacting surface adapted to be biased against the film;
   a pad for pushing said film into contact with said film contacting surface of said magnetic head;
   a positioning portion fixed with respect to said magnetic head and having a positioning surface for positioning said magnetic head; and
   a reference surface formed on the body of the camera, and toward and away from which said magnetic head is movable along a front-to-back direction of said magnetic head, said reference surface being disposed to bear against said positioning surface when said magnetic head is moved toward said reference surface, and thereby to position said magnetic head such that said film contacting surface contacts the film but causes substantially no deformation of the film.

14. A camera according to claim 13, wherein said positioning surface of said positioning portion is offset from said film contacting surface of said magnetic head along a front-to-back direction of said magnetic head.

15. A camera according to claim 13, wherein said magnetic head is biased toward said film by a spring.

16. A camera according to claim 13, wherein said magnetic head is mounted to the camera body by a plate movably attached to the camera body.

17. A camera according to claim 16, wherein said spring is located between a back side of said magnetic head and a portion of the camera body disposed rearwardly of said magnetic head.

18. A camera according to claim 15, wherein said pad is supported by spring means providing a spring force opposing that of said magnetic head biasing spring, the force of said magnetic head biasing spring being greater than that of said spring means.

19. A camera according to claim 13, wherein said reference surface is a surface of a film guide rail.

20. A camera according to claim 19, wherein said film guide rail is one of a pair of outer rails originally provided in the camera.

21. A camera according to claim 19, wherein said magnetic head is biased toward the film by a spring.

22. A camera according to claim 21, wherein said magnetic head is mounted to the camera body by a plate movably attached to the camera body.

23. A camera according to claim 22, wherein said spring is located between a back side of said magnetic head and a portion of the camera body disposed rearwardly of said magnetic head.

24. A camera according to claim 23, wherein said pad is supported by spring means providing a spring force opposing that of said magnetic head biasing spring, the force of said magnetic head biasing spring being greater than that of said spring means.

25. An apparatus comprising:
   a magnetic head for data recording or reproduction disposed so as to be in opposed relationship with a data recording portion provided on film loaded into the apparatus and having a front side with a film contacting surface adapted to be biased against said film;
   a pad for pushing said film into contact with said film contacting surface of said magnetic head;
   a positioning portion formed integrally with a housing of said magnetic head and having a front surface for positioning said magnetic head; and
   a reference surface formed on a body of the apparatus in opposed relationship with said positioning portion and with respect to which said magnetic head is movable along a front-to-back direction of said magnetic head, said reference surface being adapted to bear against said front surface of said positioning portion to thereby position said magnetic head such that said film contacting surface of said magnetic head contacts the film but causes substantially no deformation of the film.

26. An apparatus according to claim 25, wherein said front surface of said positioning portion is offset from said film contacting surface of said magnetic head along a front-to-back direction of said magnetic head.

27. An apparatus according to claim 25, wherein said magnetic head is biased toward said film by a spring.

28. An apparatus according to claim 27, wherein said pad is supported by spring means providing a spring force opposing that of said magnetic head biasing spring, the force of said magnetic head biasing spring being greater than that of said spring means.

29. An apparatus comprising:
   a magnetic head for data recording or reproduction disposed so as to be in opposed relationship with a data recording portion provided on film loaded into the apparatus and having a front side with a film contacting surface adapted to be biased against said film;
   a pad for pushing said film into contact with said film contacting surface of said magnetic head;
   a film guide rail attached to a body of the apparatus for guiding said film; and
   a positioning portion disposed on said magnetic head and having a front surface disposed in opposition to a surface of said film guide rail;
   said surface of said film guide rail being adapted to bear against said front surface of said positioning portion to thereby position said magnetic head such that said film contacting surface of said magnetic head contacts the film but causes substantially no deformation of the film.

30. An apparatus according to claim 29, wherein said magnetic head is biased toward the film by a spring.

31. An apparatus according to claim 30, wherein said pad is supported by spring means providing a spring force opposing that of said magnetic head biasing spring, the force of said magnetic head biasing spring being greater than that of said spring means.

32. An apparatus comprising:
   a magnetic data recording or reproduction head for disposition in opposed relationship with a data recording portion provided on film loaded into the apparatus and having a front side with a film contacting surface adapted to be biased against the film;

a pad for pushing said film into contact with said film contacting surface of said magnetic head;

a positioning portion fixed with respect to said magnetic head and having a positioning surface for positioning said magnetic head; and a reference surface formed on a body of the apparatus, and toward and away from which said magnetic head is movable along a front-to-back direction of said magnetic head, said reference surface being disposed to bear against said positioning surface when said magnetic head is moved toward said reference surface, and thereby to position said magnetic head such that said film contacting surface contacts the film but causes substantially no deformation of the film.

33. An apparatus camera according to claim 32, wherein said reference surface is a surface of a film guide rail.

34. An apparatus camera according to claim 33, wherein said film guide rail is one of a pair of outer rails originally provided in the apparatus.

35. An apparatus according to claim 33, wherein said magnetic head is biased toward the film by a spring.

36. An apparatus according to claim 35, wherein said magnetic head is mounted to a movable plate.

37. An apparatus according to claim 36, wherein said spring is located between a back side of said magnetic head and a portion of the apparatus disposed rearwardly of said magnetic head.

38. An apparatus according to claim 37, wherein said pad is supported by spring means providing a spring force opposing that of said magnetic head biasing spring, the force of said magnetic head biasing spring being greater than that of said spring means.

* * * * *